(12) United States Patent
Krach

(10) Patent No.: US 9,101,115 B2
(45) Date of Patent: Aug. 11, 2015

(54) DEVICE FOR LEADING ANIMALS BY MEANS OF A LEASH

(71) Applicant: Stephan Krach, Haunetal/Holzheim (DE)

(72) Inventor: Stephan Krach, Haunetal/Holzheim (DE)

(*) Notice: Subject to any disclaimer, the term of this patent is extended or adjusted under 35 U.S.C. 154(b) by 157 days.

(21) Appl. No.: 13/936,358

(22) Filed: Jul. 8, 2013

(65) Prior Publication Data

US 2014/0014045 A1 Jan. 16, 2014

(30) Foreign Application Priority Data

Jul. 11, 2012 (DE) .......................... 10 2012 106 235

(51) Int. Cl.
*A01K 27/00* (2006.01)
*B65H 75/44* (2006.01)

(52) U.S. Cl.
CPC ............... *A01K 27/004* (2013.01); *A01K 27/00* (2013.01); *B65H 75/446* (2013.01); *B65H 75/4431* (2013.01); *B65H 2701/35* (2013.01)

(58) Field of Classification Search
CPC ... A01K 27/004; A01K 27/003; A01K 27/00; A01K 27/005; A01K 27/002
USPC .................................. 119/796, 795, 797, 798
See application file for complete search history.

(56) References Cited

U.S. PATENT DOCUMENTS

| 3,477,410 | A | * | 11/1969 | Lettieri | 119/794 |
|---|---|---|---|---|---|
| 3,693,596 | A | * | 9/1972 | Croce et al. | 119/796 |
| 3,853,283 | A | * | 12/1974 | Croce et al. | 242/381.6 |
| D300,474 | S | * | 3/1989 | Caulder et al. | D29/101.1 |
| 4,977,860 | A | * | 12/1990 | Harwell | 119/794 |
| 5,733,231 | A | * | 3/1998 | Corn et al. | 482/120 |
| D430,957 | S | * | 9/2000 | Boucugnani et al. | D29/100 |
| 6,688,260 | B2 | * | 2/2004 | Morrison | 119/796 |
| 7,610,880 | B2 | * | 11/2009 | Lord | 119/794 |
| 8,230,822 | B2 | * | 7/2012 | Smith | 119/794 |
| 8,251,020 | B2 | * | 8/2012 | Matthews | 119/796 |
| 8,253,572 | B2 | * | 8/2012 | Lytle, Jr. | 340/573.3 |
| 8,347,824 | B2 | * | 1/2013 | Marshall | 119/794 |
| 8,839,745 | B1 | * | 9/2014 | Johnston | 119/795 |

FOREIGN PATENT DOCUMENTS

DE 10143318 A1 3/2003

* cited by examiner

*Primary Examiner* — Yvonne Abbott-Lewis
(74) *Attorney, Agent, or Firm* — Abel Law Group, LLP

(57) ABSTRACT

The invention relates to a device for leading animals by means of a leash. The leash is fastened, via a coupling element, on a strap which can be worn around a user's hips. The release and roll-up mechanism is present between the leash and the strap for releasing the leash under pulling action and for automatically rolling up the released leash by means of spring force. The operations of releasing and rolling up the leash can be limited manually by means of a blocking mechanism.

8 Claims, 4 Drawing Sheets

DEVICE FOR LEADING ANIMALS BY MEANS OF A LEASH

CROSS-REFERENCE TO RELATED APPLICATIONS

The present application claims priority under 35 U.S.C. 119 of German Patent Application No. 10 2012 106 235.8, filed Jul. 11, 2012, the entire disclosure of which is expressly incorporated by reference herein.

BACKGROUND OF THE INVENTION

1. Field of the Invention

The invention relates to a device for leading animals by means of a leash, as is known generically from DE 101 43 318 A1.

2. Discussion of Background Information

If animals, in particular dogs, are being guided by means of a leash, the person using the leash often has his freedom of movement restricted. Therefore known animal leashes, for example dog leashes, have to be held in the user's hand. On the one hand, this means that the hand holding the leash is unable to do anything else; on the other hand, sudden pulling of the animal on the leash causes significant jolting of the user's back. If the leash is held in the hand, this jolting acts, via the shoulder joint, at a point way beyond the center of mass of the user's body. It is precisely in the case of strong animals that this gives rise to the risk of the user falling over. Moreover, if use is made of conventional devices, the upper part of the user's body is inclined forward, which can lead to muscle tension and spinal-disk problems. In addition, for strong animals, considerable effort is involved in keeping an upright posture, as a result of which the user becomes tired quickly. It is often also the case that weaker individuals are not physically able to hold strong animals using conventional leashes.

There is the further disadvantage that only one hand is free, as a result of which the ability to do anything else or to practice any kind of sport is at least vastly restricted.

DE 101 43 318 A1 therefore discloses a device which is intended for leading animals by means of a leash and in the case of which jolting on the leash acts, for example, within the center of mass of the user's body. This is achieved by proposing a device to which a dog leash can be attached and which can be fastened by a double strap around the region of the user's stomach. A further advantage with the proposed device is that the user has both hands free while he is leading the animal on the leash.

The disadvantage with this solution is that sudden changes in distance between the user and animal can result in the user becoming entangled in the leash, which is then hanging down loosely, and there is a risk of the user falling over.

It is an object of the invention to propose a way of allowing an animal to be led on a leash without the user's hands being unable to do anything else and of reducing the risk of the user falling over.

SUMMARY OF THE INVENTION

The present invention provides a device for leading animals by means of a leash. The leash is fastened, via a coupling element, on a strap which can be worn around a user's hips. The device according to the invention comprises a release and roll-up mechanism between the leash and the strap for the purposes of releasing the leash under pulling action and of automatically rolling up the released leash by means of spring force. The operations of releasing and rolling up the leash can be limited manually by means of a blocking mechanism.

A device according to the invention advantageously avoids the situation where, when there is a change in distance between the user and animal, the leash can become entangled around certain obstacles or the user's legs. In addition, it is possible to set a maximum distance between the user and animal by means of the blocking mechanism.

In a preferred embodiment of the device according to the invention, the release and roll-up mechanism is enclosed by a housing which has a baseplate, on which is arranged an accommodating unit which projects into the housing and is intended for accommodating the release and roll-up mechanism.

Such a configuration of the device advantageously achieves the situation where tensile forces which act on the device via the leash, rather than acting on the housing, are led directly to the baseplate, via the accommodating unit. It is an essential idea of the invention for tensile forces which occur to be led directly to the baseplate without the housing being subjected to loading by tensile forces.

A frame with at least in each case two mutually opposite end walls, first side walls and second side walls, each with a slot, is present on that side surface of the baseplate which is directed away from the housing. The frame, on the end walls, has slot-like openings, which are connected to one another in a first direction by a channel which runs through the frame. The channel contains a clamping pin, which is arranged perpendicularly to the first direction and is mounted, and guided, in the slots of the second side walls such that it can be displaced at an acute angle to the first direction, wherein the clamping pin can be displaced obliquely in the direction of one of the end sides and one of the first side walls, and it is possible to set a distance between the clamping pin and the first side wall.

The openings may be configured such that they are delimited merely by the end surfaces of the first and second side walls. These end surfaces then form the respective end wall.

A channel is understood to be any through-connection between the openings. A channel, within the context of the description, is also achieved when openings are present in the end walls and the frame is of hollow configuration. Moreover, it is possible for at least one of the first and second side walls to have one or more through-passages.

A strap can preferably be guided into the frame through one of the slot-like openings and guided through between the clamping pin and the first side wall. The strap is clamped by virtue of the clamping pin being displaced in the direction of the first side wall, as a result of a reduction in the distance between the clamping pin and first side wall. This embodiment of the device according to the invention allows quick and variable adaptation of the length of the strap to the user's measurements.

It is advantageous if the channel and the openings are dimensioned such that use can be made of conventional straps or belts. The strap is preferably designed so that the device can be worn around a user's hips.

The clamping pin, for the purpose of increasing its roughness, may have a structured surface. This improves the grip of the clamped strap.

It is possible, in a further-reaching configuration of the device according to the invention, for a first touch-and-close strip of a touch-and-close fastener to be fitted on an outwardly oriented surface of the frame, preferably on an outwardly oriented surface of a first side wall. The first touch-and-close strip can be brought into contact with a second touch-and-close strip, as a result of which a touch-and-close fastener is formed in a known manner. A touch-and-close fastener provides an alternative way of fastening the device, for example, on the user's clothing, on a strap or a belt. The second touch-and-close strip may be of detachable configuration, e.g. in the form of a push-on loop on a strap or a belt.

If the device according to the invention is fastened, by means of the touch-and-close fastener, for example on the user's clothing or belt, it is possible for the device, under the action of pronounced tensile forces, to be separated, in particular ripped away, from the user. This reduces the risk of the user falling over. Pronounced tensile forces can occur, for example, when the animal (suddenly) rushes ahead or stays behind. The device is also separated from the user when the animal gets caught up in an obstruction and the user keeps going. This additionally reduces the risk of injury to the animal (e.g. by strangulation).

The size of the contact surface over which the first and the second touch-and-close strips can be brought into contact with one another in order to form the touch-and-close fastener may be selected in dependence on the size and/or strength of the animal. Selecting the size of the contact surface and the nature of the first and of the second touch-and-close strips in respect of the materials thereof, surface nature and resultant force which is necessary for detachment of the touch-and-close fastener (ripaway force) allows individual adaptation of the rip-away force.

In a further possible embodiment of the device according to the invention, the release and roll-up mechanism is enclosed by the housing, which has the baseplate, on which is arranged the accommodating unit, which projects into the housing and is intended for accommodating the release and roll-up mechanism. The first touch-and-close strip of the touch-and-close fastener is present on a side surface of the base plate which is directed away from the housing. There is no channel present.

A tensile force led onto the baseplate of the housing is advantageously transmitted to the user's body via the frame and the strap. If the strap is fastened in the region of the user's hips, the tensile force is transmitted, for example, to the center of mass of the user's body.

In a development of the device according to the invention, a pushbutton switch for actuating the blocking mechanism is present on the housing.

In a preferred embodiment of the device, the blocking mechanism comprises a perforated disk which is arranged in rotatable manner about its center axis. The perforated disk has holes arranged on a circular ring and is connected rigidly to a leash reel, on which the leash can be unrolled and rolled up. Also present is a locking pin which, by virtue of the pushbutton switch being actuated, can be advanced up to one of the holes of the perforated disk. In the assembled state of the device according to the invention, the center axes of the perforated disk and of the pin are considered, for the sake of simplicity, as coinciding, and just one center axis will be referred to hereinbelow.

Advancing the locking pin up to a hole of the perforated disk is understood to mean the locking pin engaging in the relevant hole of the perforated disk (advanced position). The locking pin can also be advanced up to a rest position, in which the locking pin does not engage in a hole. The perforated disk is prevented from rotating about the center axis by a locking pin located in the advanced position. Rotation is possible, in contrast, when the locking pin is located in the rest position. Such a configuration of the device according to the invention has the advantage that the locking pin can achieve high retaining forces despite small dimensions of the blocking mechanism. Braking and blocking mechanisms which are known from the prior art act on the circumference of the leash reel, as a result of which the device has to be constructed with large dimensions.

The locking pin can be advanced alternately up to an advanced position and a rest position preferably by means of an advancement mechanism. The advancement mechanism comprises, for example, a tube with an inner toothing formation, also a pressure-exerting sleeve with an outer toothing formation, further an advancement sleeve with an outer toothing formation, and additionally a compression spring. Following each actuation of the pushbutton switch, the locking pin is arrested in its respective advanced or rest position until the pushbutton switch is actuated anew, wherein, in the advanced position, the perforated disk is secured against rotation by virtue of the locking pin engaging in one of the holes of the perforated disk and, in the rest position, the locking pin is positioned outside the perforated disk, and therefore the perforated disk can be rotated freely about the center axis.

The housing may consist of the baseplate and of walls connected to the baseplate. The walls can form a covering for the baseplate, in which the accommodating unit, the release and roll-up mechanism and the blocking mechanism are also accommodated. The housing, preferably opposite the baseplate, has a through-opening through which to guide the leash. The through-opening may be enclosed by a ring, which reduces the friction between the leash and the housing.

Introducing any tensile forces which occur into the accommodating unit and, via the latter, onto the baseplate advantageously achieves the situation where the walls of the housing do not have to absorb any tensile forces from the leash. This makes it possible for the walls of the housing to be produced from a lightweight material, for example plastics material, and for the wall thicknesses to be kept low.

BRIEF DESCRIPTION OF THE DRAWINGS

The invention will be described more fully in the following with reference to embodiment examples and drawings. In the drawings.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
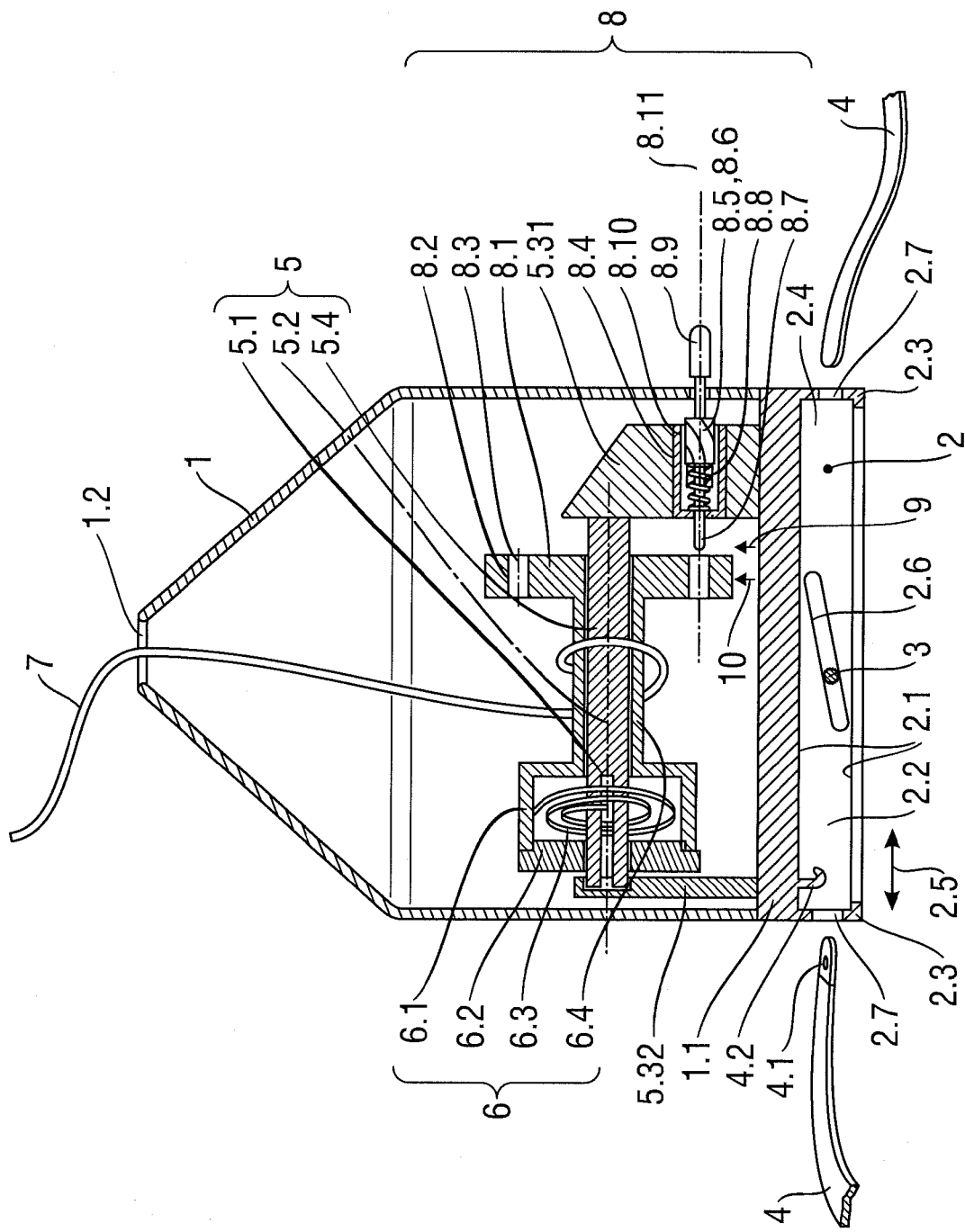
FIG. 1 shows an exemplary embodiment of the device according to the invention as a side view of a median section through the device according to the invention.

FIG. 1 shows, as the essential elements of the exemplary embodiment, a housing 1, a frame 2, an accommodating unit 5, which is arranged on the baseplate 1.1, and a leash reel 6.4 with a leash 7 fastened thereon.

The frame 2 is basically cuboidal and comprises in each case two mutually opposite first side walls 2.1, two second side walls 2.2 and two end walls 2.3. One of the first side walls 2.1 is formed by a side of the baseplate 1.1.

The end walls 2.3 each contain a slot-like opening 2.7, by means of which a channel 2.4, which runs through the frame 2 in a first direction 2.5, is delimited in the first direction 2.5. The channel 2.4 is dimensioned such that a strap 4 can be inserted into the channel 2.4 through one of the openings. The first side wall 2.1, which is directed away from the baseplate 1.1, has through-passages in it, and therefore the strap 4, inserted into the channel 2.4, can be fed manually around a clamping pin 3, arranged in the center of the channel 2.4, and back again to the opening 2.7. The clamping pin 3 is mounted, at each of its distal regions, in a slot 2.6, one each of these being present in the second side walls 2.2. The slots 2.6, which are located congruently in relation to one another, are present in the second side walls 2.2 in an inclined manner in relation to the first direction 2.5 and run at an acute angle toward the first side surfaces 2.1. The clamping pin 3 can be displaced along the slots 2.6, and it is therefore possible to change a distance between the clamping pin 3 and the first side walls 2.1. The slots 2.6 here are designed such that the distance from the first sidewall 2.1, formed by the baseplate 1.1, can be kept small enough for a conventional strap 4 of at least 0.5 mm in thickness to be capable of being clamped between the clamping pin 3 and first side wall 2.1. If a strap 4 is wrapped around the clamping pin 3, and if that end wall 2.3 through which that end of the strap 4 which is wrapped around the clamping pin 3 is inserted is subjected to tensile force in the first direction via the strap 4, the clamping pin 3 is pulled obliquely along the slots 2.6, onto that first side wall 2.1 which is formed by the baseplate 1.1, until the strap 4 is clamped (not shown). Another end of the strap 4 is provided with an eyelet 4.1, which can be fitted on a hook 4.2 arranged in the frame 2.

In further embodiments, it is also possible for the slots 2.6 to be configured differently. They may also be of angled design.

The clamping pin 3 is provided with diamond-shaped structures (not shown) on its surface in order to increase the roughness of the surface. In further embodiments of the invention, it is also possible for the structures to be formed differently, for example as protuberances, grooves, points or of combinations of these.

The baseplate 1.1 is fixed to the frame 2. In the exemplary embodiment, the frame 2 is formed on the baseplate 1.1. In further embodiments, it may also be connected to the baseplate 1.1 in a force-fitting, form-fitting and/or integral manner.

The accommodating unit 5 is arranged on the baseplate 1.1. This accommodating unit has a first bearing 5.31 and a second bearing 5.32. Along a center axis 5.2, a spindle 5.4 is present between the two bearings 5.31, 5.32, this spindle running parallel to the baseplate 1.1 and being spaced apart from the latter. At one of its ends, the spindle 5.4 has an accommodating slot 5.1, which passes through the spindle 5.4.

A release and roll-up mechanism 6 is plugged onto the spindle 5.4. The release and roll-up mechanism 6 comprises a leash reel 6.4 for accommodating the leash 7. A spring housing 6.1 is present on the leash reel 6.4 at that end of the latter which is directed toward the second bearing 5.32. The spring housing 6.1 contains a helical spring 6.3, of which the end engages in the accommodating slot 5.1 and the other end is mounted in the spring housing 6.1. The spring housing 6.1 is closed in the direction of the second bearing 5.32 by a housing cover 6.2, wherein a hole through which to guide the spindle 5.4 is present in the center of the housing cover 6.2.

The second bearing 5.32 is connected in a detachable manner to the baseplate 1.1. When the release and roll-up mechanism 6 is being fitted on the accommodating unit 5, the second bearing 5.32 is removed, and the release and roll-up mechanism 6 is pushed onto the spindle 5.4 and one end of the helical spring 6.3 is inserted into the accommodating slot 5.1. The second bearing 5.32 is then fitted.

If the leash reel 6.4 is subjected, via the leash 7, to a tensile force which is greater than a restoring force of the helical spring 6.3, the leash reel 6.4 is rotated about the center axis 5.2 and the leash 7 is unrolled from the leash reel 6.4. If the tensile force decreases below the restoring force of the helical spring 6.3, the leash reel 6.4 is rotated back about the center axis 5.2 by the action of the helical spring 6.3, wherein the leash 7 is rolled up again onto the leash reel 6.4.

A perforated disk 8.1 with holes 8.2, which are introduced into the perforated disk 8.1 over a circular path 8.3 (indicated) running concentrically around the center axis 5.2, is present at that end of the leash reel 6.4 which is directed toward the first bearing 5.31.

The first bearing 5.31 contains a horizontally directed through-bore 8.10, of which the bore axis 8.11 (merely indicated) intersects the circular path 8.3 at a point. A tube with an inner toothing formation 8.4 is inserted concentrically into the through-bore 8.10. A pressure-exerting sleeve with an outer toothing formation 8.5, an advancement sleeve with an outer toothing formation 8.6 (pressure-exerting and advancement sleeves are shown as one element for the sake of simplicity), a locking pin 8.7 and a compression spring 8.8 are arranged along the bore axis 8.11. Together with a pushbutton switch 8.9, which acts, via the pressure-exerting sleeve with the outer toothing formation 8.5, on the other given components along the bore axis 8.11, a mechanism based on a principle as is known in general from propelling ballpoint pens is formed.

By virtue of pressure being exerted on the pushbutton switch 8.9, the locking pin 8.7, located in a rest position 9, can be moved into an advanced position 10 and is arrested in the advanced position 10. The advanced position 10 is selected such that the locking pin 8.7 has one of its ends engaging in a hole 8.2 which corresponds with the advanced position 10, as a result of which the perforated disk 8.1, and with it also the leash reel 6.4 and the spring housing 6.1 with housing cover 6.2, are likewise arrested and prevented from rotating about the center axis 5.2. As a result of the pushbutton switch 8.9 being actuated anew, the arresting action of the locking pin 8.7 is disengaged and the locking pin 8.7 is moved, by action of the compression spring 8.8, into the rest position 9 shown and retained there. The release and roll-up mechanism 6 can be rotated again about the center axis 5.2.

The housing 1 is screwed on the baseplate 1.1. Opposite the baseplate 1.1, a through-opening 1.2 through which to lead the leash 7 is present in the housing 1, which is configured in the form of a pyramid positioned on a cuboid. The peripheries of the through-opening 1.2 are rounded to form a ring (indicated) which reduces the friction between the leash 7 and housing 1. With the exception of possible bending loading which can be transmitted to the housing 1 as a result of the leash 7 running out over the periphery of the through-opening 1.2, the housing 1 does not have to absorb any tensile forces acting on the leash 7.

When use is made of the device according to the invention, one end of a strap 4 is inserted through one opening 2.7 and fastened on the hook 4.2 by means of the eyelet 4.1, whereas the other end of the strap 4 is inserted through the other opening 2.7, guided around the clamping pin 3 and pushed out of the frame, once again, through the opening 2.7. Pulling on the strap 4 causes the latter to be clamped between the clamping pin 3 and first side wall 2.1. A desired length of the strap 4 can thus be adapted straightforwardly to the measurements of a person using the device and to possibly varying items of clothing. A set length of the strap 4 is defined in a reversible manner by the clamping.

The device is strapped around the region of the user's hips and/or stomach and the animal which is to be led is attached to the leash 7. For this purpose, a suitable closure, for example a carabiner hook, simplex hook or scissors hook, may be present at the free end of the leash 7. A length of the leash 7, which can be unrolled from the leash reel 6.4, is defined by the maximum length of this leash and can be limited manually, in addition, by actuation of the blocking mechanism 8 using the pushbutton switch 8.9. The device can also be used without using the blocking mechanism 8, wherein the released length of the leash 7 varies in dependence on the pulling action to which the release and roll-up mechanism 6 is subjected by the animal.

Figure 2:
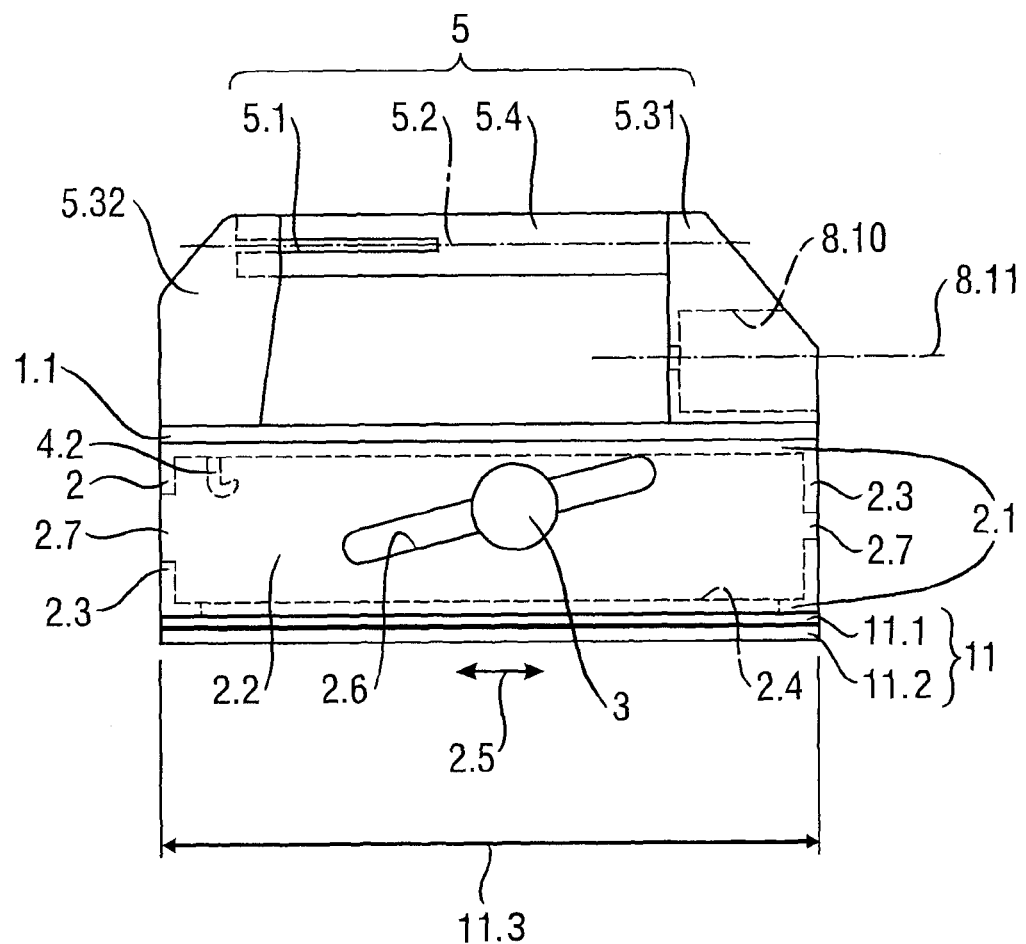
FIG. 2 shows a detail of the accommodating unit, baseplate and frame of the exemplary embodiment in a side view with a channel and a touch-and-close fastener.

FIG. 2 highlights some details of the device according to the invention. The figure shows the first side walls 2.1, the second side wall 2.2, which is directed toward the viewer, and the end walls 2.3 with openings 2.7. The frame 2 is formed on the baseplate 1.1. The channel 2.4, a slot 2.6 with clamping pin 3, and the first direction 2.5, are illustrated. This first direction is to be understood as defining directions to both sides. In the first bearing 5.31, the through-bore 8.10 is shown, along the bore axis 8.11, with different diameters. The tube with the inner toothing formation 8.4 (not shown) can be inserted in the region of the larger diameter. In further embodiments of the device, it may also be possible for the inner toothing formation to be present directly on the inner wall of the through-bore 8.10. The locking pin 8.7 (see FIG. 3) can be guided through the smaller diameter of the through-bore 8.10. The transition between the two diameters serves as an abutment for the compression spring 8.8 (see FIG. 3).

The spindle 5.4 is attached horizontally to the first bearing 5.31. The center axis 5.2, running parallel to the baseplate 1.1, the accommodating slot 5.1 and the second bearing 5.32 of the accommodating unit 5 are shown in the fitted state. A distance between the spindle 5.4 and the baseplate 1.1 is selected to be large enough for a fitted release and roll-up mechanism 6 (not shown) to be capable of being rotated about the center axis 5.2.

A first touch-and-close strip 11.1 (shown in a highly schematic manner) is present on the outwardly oriented surface of the first side wall 2.1, which is directed away from the accommodating unit 5. The first touch-and-close strip 11.1 is brought into connection with a second touch-and-close strip 11.2 via a contact surface 11.3 (indicated by a line), as a result of which a touch-and-close fastener 11 is formed between the first touch-and-close strip 11.1 and second touch-and-close strip 11.2. The second touch-and-close strip 11.2 is configured as a loop (not shown) and can be pushed onto a strap 4 or belt.

Figure 3:
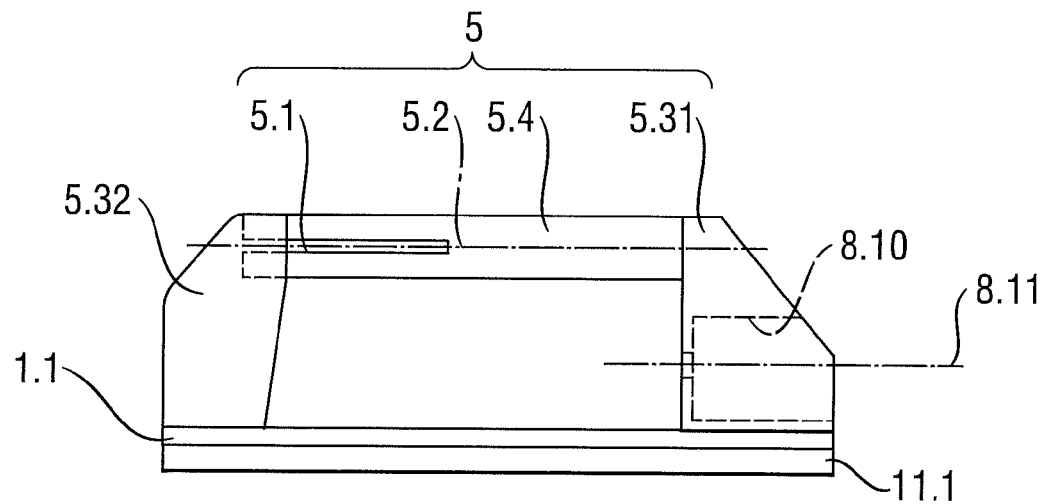
FIG. 3 shows a detail of the accommodating unit, baseplate and frame of the exemplary embodiment in a side view just with a touch-and-close fastener.

In an exemplary embodiment according to FIG. 3, the first touch-and-close strip 11.1 is fitted directly on a side surface of the baseplate 1.1 which is directed away from the accommodating unit 5. There is no frame 2 present. Otherwise, the embodiment of the device according to the invention corresponds to the exemplary embodiment according to FIG. 2.

Figure 4:
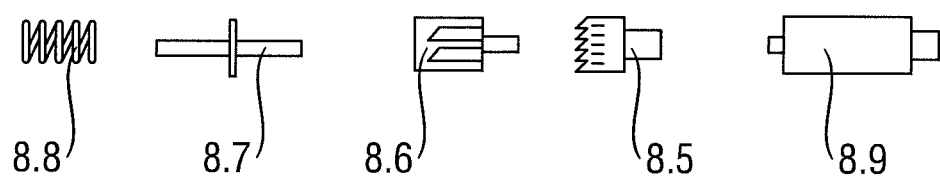
FIG. 4 shows elements of the blocking mechanism of the exemplary embodiment according to FIG. 1.

FIG. 4 shows individual elements of the blocking mechanism 8 in a simplified manner. The pushbutton switch 8.9 can be positioned on the pressure-exerting sleeve with the outer toothing formation 8.5. An extension of the advancement sleeve with the outer toothing formation 8.6 can be inserted loosely into the pressure-exerting sleeve with the outer toothing formation 8.5. The locking pin 8.7 has a disk-like cross-sectional thickening, which forms an abutment for the compression spring 8.8.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Housing
1.1 Baseplate
1.2 Through-opening
2 Frame
2.1 first Side wall
2.2 second Side wall
2.3 End wall
2.4 Channel
2.5 first Direction
2.6 Slot
2.7 Opening
3 Clamping pin
4 Strap
4.1 Eyelet
4.2 Hook
5 Accommodating unit
5.1 Accommodating slot
5.2 Center axis
5.31 first Bearing
5.32 second Bearing
5.4 Spindle
6 Release and roll-up mechanism
6.1 Spring housing
6.2 Housing cover
6.3 Helical spring
6.4 Leash reel
7 Leash
8 Blocking mechanism
8.1 Perforated disk
8.2 Hole
8.3 Circular ring
8.4 Tube with an inner toothing formation
8.5 Pressure-exerting sleeve with an outer toothing formation
8.6 Advancement sleeve with an outer toothing formation
8.7 Locking pin
8.8 Compression spring
8.9 Pushbutton switch
8.10 Through-bore
8.11 Bore axis
9 Rest position
10 Advanced position
11 Touch-and-close fastener 11.1 first Touch-and-close strip
11.2 second Touch-and-close strip

What is claimed is:

1. A device for leading animals by means of a leash, wherein the leash is fastened, via a coupling element, on a strap which can be worn around a user's hips, and a release and roll-up mechanism is present between the leash and the strap for releasing the leash under pulling action and for automatically rolling up the released leash by spring force, and wherein releasing and rolling up the leash can be limited manually by a blocking mechanism and the release and roll-up mechanism is enclosed by a housing which comprises a baseplate on which is arranged an accommodating unit which projects into the housing and accommodates the release and roll-up mechanism, a frame comprising at least in each case two mutually opposite end walls, first side walls, and second side walls, each with a slot, is present on that side surface of the baseplate which is directed away from the housing, the frame, on the end walls, comprises slot-like openings, which are connected to one another in a first direction by a channel which runs through the frame, the channel which runs through the frame comprises arranged therein a clamping pin, which is arranged perpendicularly to the first direction and is mounted, and guided, in the slots of the second side walls such that it can be displaced at an acute angle to the first direction, wherein the clamping pin can be displaced obliquely in a direction of one of the end walls and one of the first side walls, and it is possible to set a distance between the clamping pin and the first side wall.

2. The device of claim 1, wherein the strap can be introduced into the frame through an opening thereof and guided through between the clamping pin and the first side wall, and the strap can be clamped by virtue of the clamping pin being displaced in a direction of the first side wall, as a result of a reduction in a distance between the clamping pin and first side wall.

3. The device of claim 2, wherein the clamping pin, for the purpose of increasing its roughness, has a structured surface.

4. The device of claim 2, wherein the housing is assigned a pushbutton switch for actuating the blocking mechanism.

5. The device of claim 4, wherein the blocking mechanism comprises a perforated disk which is arranged in a rotatable manner about its center axis and has holes arranged on a circular ring, and is connected rigidly to a leash reel on which the leash can be unrolled and rolled up, and wherein the device further comprises a locking pin which, by virtue of the pushbutton switch being actuated, can be advanced up to one of the holes of the perforated disk.

6. The device of claim 5, wherein the locking pin can be advanced alternately up to an advanced position and a rest position by an advancement mechanism comprising a tube with an inner toothing formation, further a pressure-exerting sleeve with a first outer toothing formation, further an advancement sleeve with a second outer toothing formation, and additionally a compression spring, and, following each actuation of the pushbutton switch, the locking pin is arrested in its respective advanced or rest position until the pushbutton switch is actuated anew, and wherein, in the advanced position, the perforated disk is secured against rotation by virtue of the locking pin engaging in one of the holes of the perforated disk and, in the rest position, the locking pin is positioned outside the perforated disk, allowing the perforated disk to rotate freely about its center axis.

7. The device of claim 1, wherein a first touch-and-close strip of a touch-and-close fastener is fitted on an outwardly oriented surface of a first side wall.

8. A device for leading animals by means of a leash, wherein the leash is fastened, via a coupling element, on a strap which can be worn around a user's hips, and a release and roll-up mechanism is present between the leash and the strap for releasing the leash under pulling action and for automatically rolling up the released leash by spring force, and wherein releasing and rolling up the leash can be limited manually by a blocking mechanism and the release and roll-up mechanism is enclosed by a housing which has a baseplate on which is arranged an accommodating unit which projects into the housing and accommodates the release and roll-up mechanism, and a first touch-and-close strip of a touch-and-close fastener is present on a side surface of the baseplate which is directed away from the housing.

\* \* \* \* \*